(12) United States Patent
Lan (10) Patent No.: US 12,124,161 B2
(45) Date of Patent: Oct. 22, 2024

(54) POWER SUPPLY CIRCUIT AND POWER SUPPLY METHOD FOR CAMERA MODULE AND ELECTRONIC DEVICE

(71) Applicant: VIVO MOBILE COMMUNICATION CO., LTD., Dongguan (CN)

(72) Inventor: Yongcheng Lan, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 281 days.

(21) Appl. No.: 17/901,818

(22) Filed: Sep. 1, 2022

(65) Prior Publication Data

US 2023/0004067 A1 Jan. 5, 2023

Related U.S. Application Data

(63) Continuation of application No. PCT/CN2021/077767, filed on Feb. 25, 2021.

(30) Foreign Application Priority Data

Mar. 4, 2020 (CN) .......................... 202010145442.0

(51) Int. Cl.
*G03B 7/26* (2021.01)
*H04N 23/65* (2023.01)

(52) U.S. Cl.
CPC ............... *G03B 7/26* (2013.01); *H04N 23/65* (2023.01)

(58) Field of Classification Search
USPC ............. 396/201, 301–304; 348/333.13, 372
See application file for complete search history.

(56) References Cited

U.S. PATENT DOCUMENTS

| 2012/0120239 A1* | 5/2012 | Hutzel | B60R 1/04 |
| | | | 348/143 |
| 2014/0176790 A1 | 6/2014 | Shen et al. | |

(Continued)

FOREIGN PATENT DOCUMENTS

| CN | 102762069 A | 10/2012 |
| CN | 104125384 A | 10/2014 |
| CN | 108881567 A | 11/2018 |

(Continued)

OTHER PUBLICATIONS

Extended European Search Report issued in related European Application No. 21763783.4, mailed Jun. 28, 2023, 12 pages.

(Continued)

*Primary Examiner* — Clayton E. LaBalle
*Assistant Examiner* — Warren K Fenwick
(74) *Attorney, Agent, or Firm* — IPX PLLC (57) ABSTRACT

A power supply circuit and a power supply method for a camera and an electronic device are provided. The camera is detachably connected to a body of the electronic device, a power source is arranged in the body, and the circuit includes: a first power supply pin and a second power supply pin that are arranged on the body; a power source pin and a ground pin that are arranged on the camera, where in a case that the camera is mounted at a preset position of the body, the power source pin is in contact with one of the first power supply pin and the second power supply pin, and the ground pin is in contact with the other of the first power supply pin and the second power supply pin; a first switch.

17 Claims, 5 Drawing Sheets

(56) References Cited

U.S. PATENT DOCUMENTS

2017/0111568 A1    4/2017  Hsieh et al.
2022/0416557 A1*   12/2022 Yin ..................... H02J 7/00712

FOREIGN PATENT DOCUMENTS

| CN | 108900755  | A  | 11/2018 |
|----|------------|----|---------|
| CN | 208581257  | U  | 3/2019  |
| CN | 111246112  | A  | 6/2020  |
| JP | 3112348    | B2 | 11/2000 |
| JP | 200169391  | A  | 3/2001  |
| JP | 200387620  | A  | 3/2003  |
| JP | 2003198910 | A  | 7/2023  |

OTHER PUBLICATIONS

Notice of reason of refusal issued in related Japanese Application No. 2022-552143, mailed Aug. 22, 2023, 3 pages.
International Search Report issued in corresponding International Application No. PCT/CN2021/077767, mailed May 14, 2021, 4 pages.

* cited by examiner

FIG. 7

POWER SUPPLY CIRCUIT AND POWER SUPPLY METHOD FOR CAMERA MODULE AND ELECTRONIC DEVICE

CROSS-REFERENCE TO RELATED APPLICATIONS

The application is a continuation of International Application No. PCT/CN2021/077767, filed on Feb. 25, 2021, which claims priority to Chinese Patent Application No. 202010145442.0, filed on Mar. 4, 2020. The entire contents of each of the above-identified applications are expressly incorporated herein by reference.

TECHNICAL FIELD

This application relates to the field of communication technologies, and in particular, to a power supply circuit and a power supply method for a camera module and an electronic device.

BACKGROUND

With the development of wireless communication technology, electronic devices such as a mobile terminal have become an indispensable part of people's lives. To reduce the space occupied by a camera module on an electronic device and provide more performance space for the industrial design of the entire electronic device, a concept of a detachable camera module comes into being. The detachable camera module, that is, the electronic device is only equipped with a camera module that is detachable and can operate independently to implement original functions of a camera such as rear shooting and front shooting.

In the related art, an independent power supply manner is usually used in the detachable camera module, that is, a battery is arranged in the camera module. In the power supply manner, to increase an operating time of the detachable camera module, a battery capacity needs to be increased. As a result, a volume of the detachable camera module is increased, which is not conducive to carrying and mounting, and affects the appearance performance of the detachable camera module. To reduce the volume of the detachable camera module to ensure the appearance performance, the battery capacity should be sacrificed, which may affect the operating time of the camera module.

SUMMARY

Embodiments of this application provide a power supply circuit and a power supply method for a camera module and an electronic device.

According to a first aspect, a power supply circuit of a camera module is provided, where the camera module is detachably connected to a body of an electronic device, a power source module is arranged in the body, and the power supply circuit includes:

a first power supply pin and a second power supply pin, where the first power supply pin and the second power supply pin are separately arranged on the body;

a power supply pin and a ground pin, where the power supply pin and the ground pin are separately arranged on the camera module, the power supply pin is in contact with one of the first power supply pin and the second power supply pin, and the ground pin is in contact with the other of the first power supply pin and the second power supply pin in a case that the camera module is mounted at a preset position of the body;

a first switch, where a first end of the first switch is connected to the first power supply pin, a second end of the first switch is connected to the power source module, a third end of the first switch is connected to a ground end, and the first switch is configured to control connection between the first power supply pin and the power supply module, and to control connection between the first power supply pin and the ground end;

a second switch, where a first end of the second switch is connected to the second power supply pin, a second end of the second switch is connected to the power source module, a third end of the second switch is connected to the ground end, and the second switch is configured to control connection between the second power supply pin and the power supply module, and to control connection between the second power supply pin and the ground end; and a processor, where the processor is separately connected to the first switch and the second switch, and the processor is configured to control on-off of the first switch and the second switch.

According to a second aspect, an electronic device is provided, including:

a body, where a power source module is arranged in the body;

a camera module detachably connected to the body; and a circuit according to the first aspect.

According to a third aspect, a power supply method for a camera module, applied to the electronic device according to the second aspect, the method including:

receiving a shooting start instruction;

obtaining a shooting mode of the camera module in response to the shooting start instruction;

controlling on/off of the first switch and the second switch based on the shooting mode, to cause a power supply pin contacting with the power source pin to be conducted with the power source module and cause a power supply pin contacting with the ground pin to be conducted with the ground end; and the shooting mode includes a front shooting mode and a rear shooting mode, an orientation of a camera of the camera module in the front shooting mode is the same as an orientation of a first surface of the body, an orientation of a camera of the camera module in the rear shooting mode is the same as an orientation of a second surface of the body, and the first surface is arranged opposite to the second surface.

The at least one technical solution adopted in this embodiment of this application can achieve the following beneficial effects:

The power source pin and the ground pin are arranged on a camera module that is detachably connected to the electronic device. The first power supply pin and the second power supply pin are arranged on the body of the electronic device, and the pins that are arranged on the camera module come into contact with the pins that are arranged on the body in a case that the camera module is mounted at the preset position of the body. Therefore, the on-off of the first switch and the second switch can be controlled by the processor according to a mounting manner of the camera module, to conduct the power supply pin contacting with the power source pin VCC with the power source module, and conduct the power supply pin contacting with the ground pin GND with the ground end. As a result, a corresponding power supply loop is formed between the power source module and the camera module, so as to implement normal power supply to the detachable camera module. In addition, the power source module that is arranged in the body of the electronic device is used to supply power to the camera module. Compared with a manner of arranging a battery in the camera module in the related art, on the one hand, a volume of the camera module can be reduced to ensure the appearance performance of the camera module, and on the other hand, a capacity of the power source module that is arranged in the body can also be increased as required to extend the operating time of the camera module without changing the volume of the camera module. As a result, both the appearance performance and operating time of the camera module can be ensured.

BRIEF DESCRIPTION OF THE DRAWINGS

The accompanying drawings described herein are used for providing a further understanding of this application, and form part of this application. Exemplary embodiments of this application and descriptions thereof are used for explaining this application, and do not constitute any inappropriate limitation to this application. In the accompanying drawings.

DETAILED DESCRIPTION

The technical solutions of this application will be described below with reference to specific embodiments of this application and the accompanying drawings. Apparently, the described embodiments are only some embodiments rather than all the embodiments of this application. All other embodiments obtained by a person skilled in the art based on the embodiments of this application without creative efforts shall fall within the protection scope of this application.

The following describes the technical solution provided in each embodiment of this application in detail with reference to the accompanying drawings.

Referring to FIG. 1 to FIG. 4, this embodiment of this application provides a power supply circuit for a camera module. The power supply circuit can, in some embodiments, include a first power supply pin PIN1, a second power supply pin PIN2, a power source pin VCC, a ground pin GND, a first switch SW1, a second switch SW2, and a processor 10.

Figure 1:
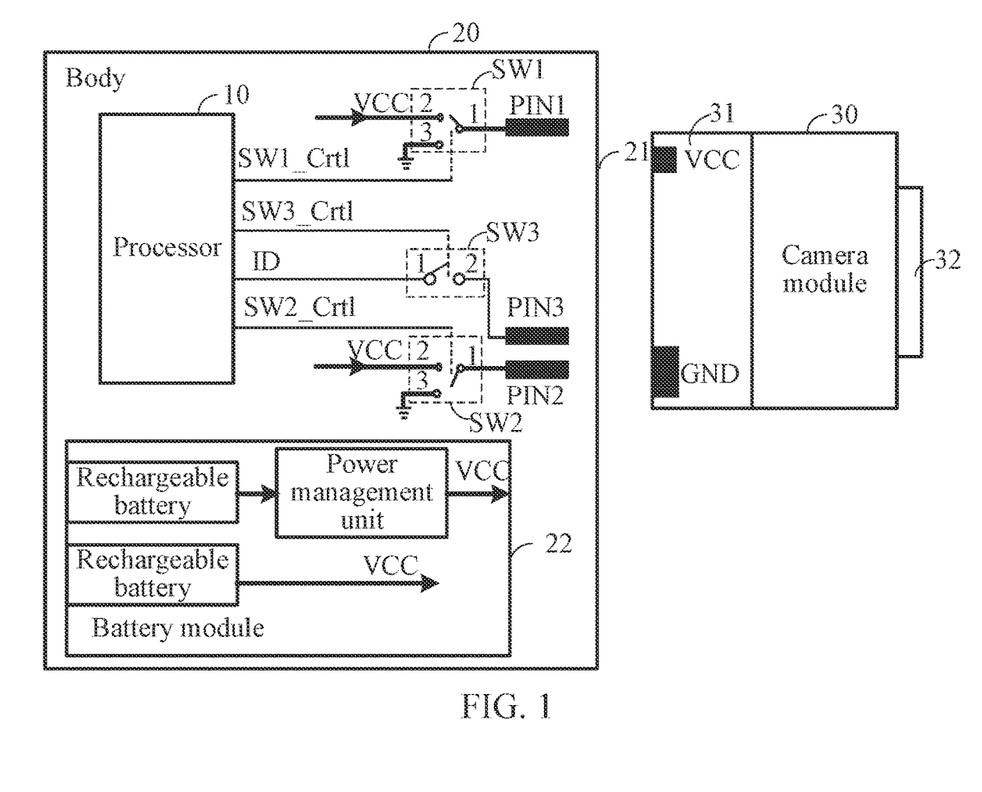
FIG. 1 is a schematic structural diagram of a power supply circuit of a camera module according to an embodiment of this application.
Figure 2:
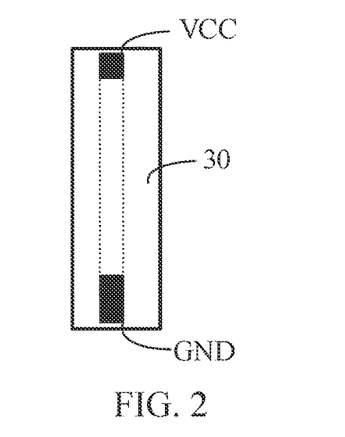
FIG. 2 is a bottom view of a camera module according to an embodiment of this application.

Wherein, the first power supply pin PIN1 and the second power supply pin PIN2 are arranged on the body 20 of the electronic device, for example, being arranged at a first end 21 of the body 20. The electronic device includes the body 20 and a camera module 30 that is detachably connected to the body 20. The first power supply pin PIN1 and the second power supply pin PIN2 may be made of metal.

The power source pin VCC and the ground pin GND are arranged on the camera module 30, for example, being arranged at a first end 31 of the camera module 30. In a case that the camera module 30 is mounted at a preset position (for example, the first end 21 of the body 20) of the body 20, the power source pin VCC is in contact with one of the first power supply pin PIN1 and the second power supply pin PIN2, and the ground pin GND is in contact with the other of the first power supply pin PIN1 and the second power supply pin PIN2. The power source pin VCC and the ground pin GND may be made of metal.

Figure 3:
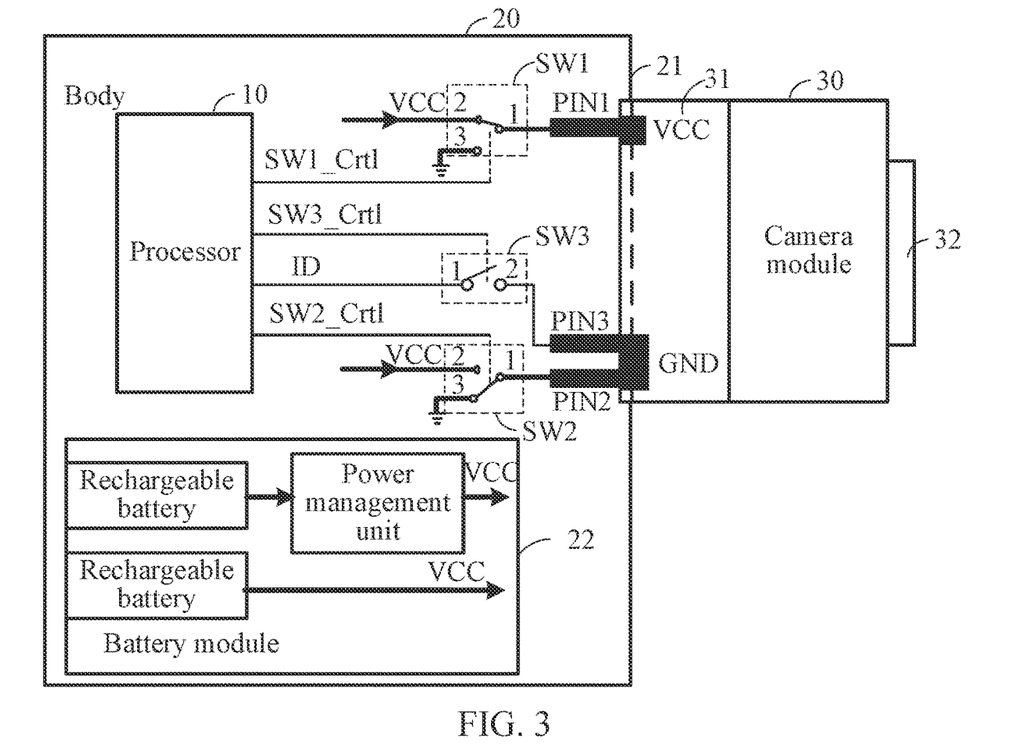
FIG. 3 is a schematic structural diagram of a power supply circuit of a camera module according to an embodiment of this application, where the camera module is in a rear shooting mode.
Figure 4:
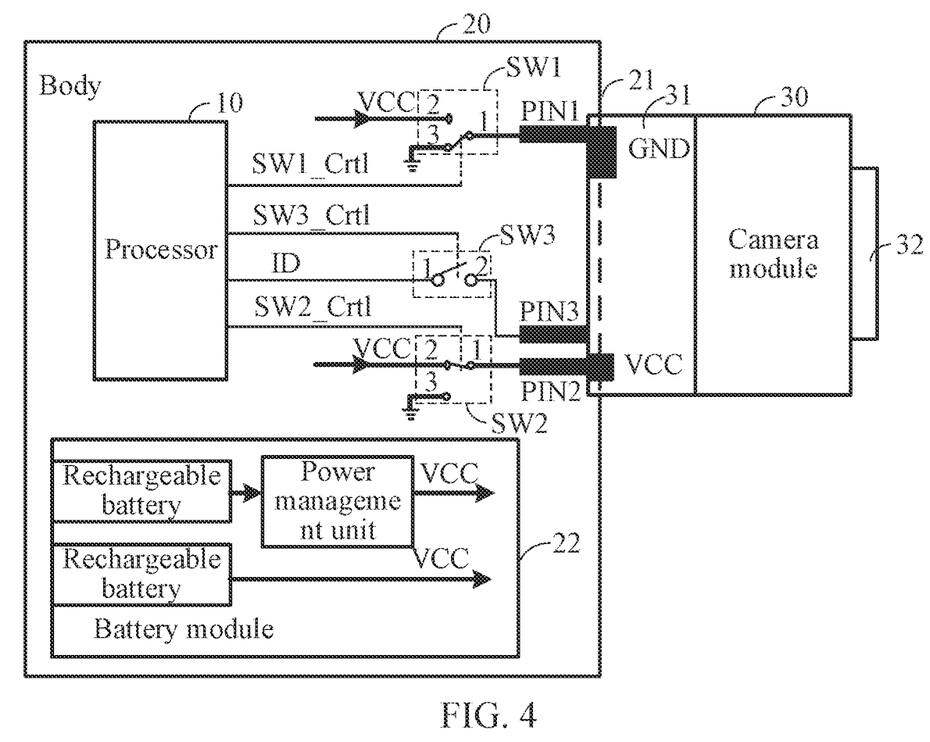
FIG. 4 is a schematic structural diagram of a power supply circuit of a camera module according to an embodiment of this application, where the camera module is in a front shooting mode.

For example, as shown in FIG. 3 and FIG. 4, the camera module 30 can be mounted at the preset position of the body 20 in two manners. As shown in FIG. 3, in a case that the camera module 30 is mounted at the preset position of the body in a first manner, the power source pin VCC is in contact with the first power supply pin PIN1, and the ground pin GND is in contact with the second power supply pin PIN2; and As shown in FIG. 4, in a case that the camera module 30 is mounted at the preset position of the body 20 in a second manner, the power source pin VCC is in contact with the second power supply pin PIN2, and the ground pin GND is in contact with the first power supply pin PIN1.

A first end of the first switch SW1 is connected to the first power supply pin PIN1, a second end of the first switch SW1 is connected to the power source module 22 that is arranged in the body 20, and a third end of the first switch SW1 is connected to a ground end. The first switch SW1 is configured to control connection between the first power supply pin PIN1 and the power source module 22, and control connection between the first power supply pin PIN1 and the ground end.

A first end of the second switch SW2 is connected to the second power supply pin PIN2, a second end of the second switch SW2 is connected to the power source module 22, and a third end of the second switch SW2 is connected to the ground end. The second switch SW2 is configured to control connection between the second power supply pin PIN2 and the power source module 22, and control connection between the second power supply pin PIN2 and the ground end.

The processor 10 is separately connected to the first switch SW1 and the second switch SW2, and is configured to control the on-off of the first switch SW1 and the second switch SW2.

For example, a control port SW1_Ctrl of the processor 10 is connected to the first switch SW1, and a control port SW2_Ctr2 is connected to the second switch SW2. In a case that the camera module 30 is mounted at the preset position of the body 20 by the mounting manner shown in FIG. 3, the processor 10 can output a first level signal through the control port SW1_Ctrl to trigger closing of the first end and the second end of the first switch SW1 to conduct the first power supply pin PIN1 with the power source module 22; and can output a second level signal through the control port SW2_Ctrl to trigger closing of the first end and the third end of the second switch SW2, so as to conduct the second power supply pin PIN2 with the ground end. Therefore, a power supply loop is formed between the power source module 22, the first power supply pin PIN1, the camera module 30, the second power supply pin PIN2, and the ground end. The power source module 22 arranged in the body 20 supplies power to the camera module 30, so that the camera module 30 can operate normally.

In a case that the camera module 30 is mounted at the preset position of the body 20 by the mounting manner shown in FIG. 4, the processor 10 outputs the second level signal through the control port SW1_Ctrl to trigger the closing of the first end and the third end of the first switch SW1 to conduct the first power supply pin PIN1 with the ground end, and outputs the first level signal through the control port SW2_Ctrl to trigger the closing of the first end and the second end of the second switch SW2, so as to conduct the second power supply pin PIN2 with the power source module 22. Therefore, a power supply loop is formed between the power source module 22, the second power supply pin PIN2, the camera module 30, the first power supply pin PIN1, and the ground end. The power source module 22 that is arranged in the body 20 supplies power to the camera module 30, so that the camera module 30 can normally operate. The first level signal may be a high level signal, and the second level signal may be a low level signal.

In this embodiment of this application, the power source pin VCC and the ground pin GND are arranged on a camera module 30. The first power supply pin PIN1 and the second power supply pin PIN2 are arranged on the body 20, and the pins that are arranged on the camera module 30 come into contact with the pins arranged on the body 20 in a case that the camera module 30 is mounted at the preset position of the body 20. Therefore, the on-off of the first switch and the second switch can be controlled by the processor 10 according to a mounting manner of the camera module 30, to conduct the power supply pin contacting with the power source pin VCC with the power source module 22, and conduct the power supply pin contacting with the ground pin GND with the ground end. As a result, a corresponding power supply loop is formed between the power source module 22 and the camera module 30, so as to implement normal power supply to the camera module 30. In addition, the power source module 22 that is arranged in the body 20 is used to supply power to the camera module 30. Compared with a manner of arranging a battery in the camera module 30 in the related art, on the one hand, a volume of the camera module 30 can be reduced to ensure the appearance performance of the camera module 30, and on the other hand, a capacity of the power source module 22 that is arranged in the body can also be increased as required to extend the operating time of the camera module 30 without changing the volume of the camera module 30. As a result, both the appearance performance and operating time of the camera module 30 can be ensured.

In this embodiment of this application, the processor 10 can be configured to obtain the shooting mode of the camera module 30 in a case that the electronic device receives the shooting start instruction, and controls the on-off of the first switch SW1 and the second switch SW2 based on the shooting mode of the camera module 30, so that the power supply pin contacting with the power source pin VCC is conducted to the power source module 22 and the power supply pin contacting with the ground pin GND is conducted to the ground end.

Figure 5:
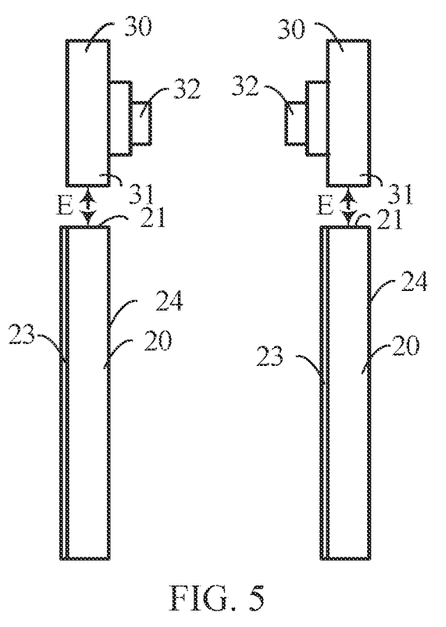
FIG. 5 is a side view of an electronic device according to an embodiment of this application.

For example, as shown in FIG. 5, the shooting modes of the camera module 30 include the front shooting mode and the rear shooting mode. The orientation of the camera 32 of the camera module 30 in the front shooting mode is the same as the orientation of the first surface 23 of the body 20, the orientation of the camera 32 of the camera module 30 in the rear shooting mode is the same as the orientation of the second surface 24 of the body 20, and the first surface 23 is arranged opposite to the second surface 24.

In an embodiment of this application, as shown in FIG. 3 and FIG. 5, the power source pin VCC is in contact with the first power supply pin PIN1, and the ground pin GND is in contact with the second power supply pin PIN2 in a case that the camera module 30 in the rear shooting mode is mounted at the preset position of the body 20. In this case, the processor 10 can be, in some embodiments, configured to control the closing of the first end and the second end of the first switch SW1, so as to conduct the first power supply pin PIN1 and the power source module 22, and control the closing of the first end and the third end of the second switch SW2, so as to conduct the second power supply pin PIN2 with the ground end. In this case, a power supply loop is formed between the power source module 22, the first power supply pin PIN1, the camera module 30, the second power supply pin PIN2, and the ground end, so that the power source module 22 normally supplies power to the camera module 30.

As shown in FIG. 4 and FIG. 5, the power source pin VCC is in contact with the second power supply pin PIN2, and the ground pin GND is in contact with the first power supply pin PIN1 in a case that the camera module 30 in the front shooting mode is mounted at the preset position of the body 20. Correspondingly, the processor 10 is, in some embodiments, configured to control the closing of the first end and the third end of the first switch SW1, so as to conduct the first power supply pin PIN1 and the ground end, and control the closing of the first end and the second end of the second switch SW2 to conduct the second power supply pin PIN2 with the power source module 22. In this case, a power supply loop is formed between the power source module 22, the second power supply pin PIN2, the camera module 30, the first power supply pin PIN1, and the ground end, so that the power source module 22 normally supplies power to the camera module 30.

It can be understood that the on-off of the first switch SW1 and the second switch SW2 is controlled based on the shooting mode of the camera module 30 to ensure normal power supply to the camera module 30 in different shooting modes, so that the electronic device with the detachable camera module can implement functions of different shooting modes, and the control logic is simple.

In another embodiment of this application, the power supply circuit for the camera module provided may further include a detection pin PIN3 and a third switch SW3.

As shown in FIG. 3, the detection pin PIN3 is arranged on the body 20, and the detection pin PIN3 is in contact with the ground pin GND in a case that the camera module 30 in the rear shooting mode is mounted at the preset position of the body 20. For example, the detection pin PIN3 may be made of conductive metal.

The first end of the third switch SW3 is connected to the detection port ID of the processor 10, the second end of the third switch SW3 is connected to the detection pin PIN3, and the control end of the third switch SW3 is connected to the control port SW3_Ctrl of the processor 10. The third switch SW3 is configured to control the on-off of the detection port ID and the detection pin PIN3.

The processor 10 is further configured to control the on-off of the third switch SW3, so as to detect the shooting mode of the camera module 30 based on the signal state of the detection port ID in a case that the electronic device receives the shooting start instruction.

In some embodiments, the processor 10 is configured to, in a case that the electronic device receives a shooting start instruction, control the third switch SW3 to conduct the detection port ID with the detection pin PIN3, control the second switch SW2 to conduct the second power supply pin PIN2 with the ground end, and detect the shooting mode of the camera module 30 based on a signal state of the detection port ID.

For example, initially, the detection port ID is in a high level state; and in a case that the electronic device receives a shooting start instruction, the processor 10 can output a first level signal through the control port SW3_Ctrl to trigger closing of the first end and the second end of the third switch SW3 to conduct the detection port ID of the processor 10 with the detection pin PIN3, and can output a second level signal through the control port SW2_Ctrl to trigger closing of the first end and the third end of the second switch SW2, so as to conduct the second power supply pin PIN2 with the ground end.

In this case, if both the second power supply pin PIN2 and the detection pin PIN3 come into contact with the ground pin GND, the second power supply pin PIN2 and the detection pin PIN3 are short-circuited, so that the detection port ID changes from a high level state to a low level state. It can be determined that the orientation of the camera 32 of the camera module 30 is the same as the orientation of the first surface 24 of the body 20, and then it can be determined that the shooting mode of the camera module 30 is the rear shooting mode.

If the second power supply pin PIN2 does not come into contact with the ground pin GND, the second power supply pin PIN2 and the detection pin PIN3 are disconnected, so that the detection port ID remains a high level state. It can be determined that the orientation of the camera 32 of the camera module 30 is the same as the orientation of the first surface 23 of the body 20, and then it can be determined that the shooting mode of the camera module 30 is the front shooting mode.

It can be understood that the processor 10 can automatically detect the shooting mode of the camera module by controlling the on-off of the third switch SW3. In addition, the processor 10 detects the shooting mode of the camera module only based on the signal state of a detection port ID, where the determining logic is simple, and a physical connection signal can be reduced.

It should be noted that, to prevent false detection of the shooting mode and damage to the processor 10 by an external electrical stress, the third switch SW3 is usually in an off state.

In an embodiment of this application, there are two ground pins GND, where one of the ground pins is in contact with the detection pin PIN3, and the other of the ground pins is in contact with the second power supply pin PIN2 in a case that the camera module 30 in the rear shooting mode is mounted at the preset position of body 20. It can be understood that, in this embodiment, the detection of the shooting mode of the camera module 30 can be implemented only by increasing the quantity of ground pins, and the embodiment is simple.

In another embodiment of this application, there is one ground pin GND, and a width of the ground pin GND is greater than a width of the power source pin VCC, and the detection pin PIN3 is close to the second power supply pin PIN2 and is located on the same straight line with the second power supply pin PIN2, so that the detection pin PIN3 can come into contact with the ground pin GND in a case that the camera module 30 in the rear shooting mode is mounted at the preset position of the body 20. FIG. 1, FIG. 3 and FIG. 4 are illustrated only by this embodiment. It can be understood that, compared with a previous embodiment, the embodiment can reduce the quantity of pins and improve the appearance performance of the camera module.

In some embodiments, the width of the ground pin GND is twice the width of the power source pin VCC. In this way, it can be ensured that an extra width contact surface of the ground pin GND can be configured to come into contact with the detection pin PIN3, and a manufacturing material of the ground pin GND can be saved, thus the cost is saved.

Further, in this embodiment of this application, the power source pin VCC and the ground pin GND are located on the same straight line, and the power source pin VCC and the ground pin GND are symmetrically arranged relative to the center line of the camera module 30. In this way, the power source pin VCC and the ground pin GND can be separated, to avoid a wrong contact between the power source pin VCC and the ground pin GND due to being too close to each other, thereby accurate recognition of the shooting state of the camera module 30 and normal power supply are ensured.

Further, in this embodiment of this application, the processor 10 can further be configured to control the first switch SW1 to conduct the first power supply pin PIN1 with the ground end, control the second switch SW2 to conduct the second power supply pin PIN2 with the ground pin GND, and control the third switch SW3 to disconnect the detection port ID from the detection pin PIN3 in a case that the electronic device receives the shooting stop instruction.

For example, in a case that the electronic device receives a shooting stop instruction, the processor 10 can output a second level signal through the control port SW1_Ctrl to trigger the first switch SW1 to conduct the first end with the third end, so that the first power supply pin PIN1 is connected to the ground; the processor 10 can output a second level signal through the control port SW2_Ctrl to trigger the second switch SW1 to conduct the first end with the third end, so that the second power supply pin PIN2 is connected to the ground; and the processor 10 can output a second level signal through the control port SW3_Ctrl to trigger the third switch SW3 to disconnect the first end with the second end, so as to connect the detection pin PIN3 to the detection port ID.

It can be understood that in a case that the electronic device receives the shooting stop instruction, the processor 10 connects the first power supply pin PIN1 and the second power supply pin PIN2 to the ground by controlling the on-off from the first switch to the third switch and the detection pin PIN3 is disconnected from the detection port ID. In this way, the processor 10 can be prevented from being damaged by an external electrical stress.

An embodiment of this application further provides an electronic device, including a body, a camera module detachably connected to the body, and a power supply circuit for the camera module described in any one of the foregoing embodiments of this application, where a power source module is arranged in the body.

In this embodiment of this application, the power source pin and the ground pin are arranged on the camera module. The first power supply pin and the second power supply pin are arranged on the body, and the pins on the camera module come into contact with the pins on the body in a case that the camera module is mounted at the preset position of the body. Therefore, the on-off of the first switch and the second switch can be controlled by the processor according to a mounting manner of the camera module, to conduct the power supply pin contacting with the power source pin VCC with the power source module, and conduct the power supply pin contacting with the ground pin GND with the ground end. As a result, a corresponding power supply loop is formed between the power source module and the camera module, so as to implement normal power supply to the detachable camera module. In addition, the power source module that is arranged in the body is used to supply power to the camera module. Compared with a manner of arranging a battery in the camera module in the related art, on the one hand, a volume of the camera module can be reduced to ensure the appearance performance of the camera module, and on the other hand, a capacity of the power source module that is arranged in the body can also be increased as required to extend the operating time of the camera module without changing the volume of the camera module. As a result, both the appearance performance and operating time of the camera module can be ensured.

In some embodiments of this application, the power source module may include a rechargeable battery, and the rechargeable battery is separately connected to the second end of the first switch and the second end of the second switch. It can be understood that the camera module can be directly powered by the rechargeable battery, and the structure is simple.

In another embodiment of this application, the power source module may include a rechargeable battery, and a Power Management Unit (PMU), and the rechargeable battery is separately connected to the second end of the first switch and the first end of the second switch through the power management unit. It can be understood that, in this embodiment, a power management unit is added between the rechargeable battery and the first switch and the second switch, problems such as the management and power conservation of the rechargeable battery can be resolved, the power usage of the rechargeable battery can be effectively optimized, and the operating time of the rechargeable battery can be extended.

Further, the processor, the first switch, the second switch, and the third switch in the power supply circuit of the camera module can all be arranged in the body, so as to improve the appearance performance of the body.

Figure 6:
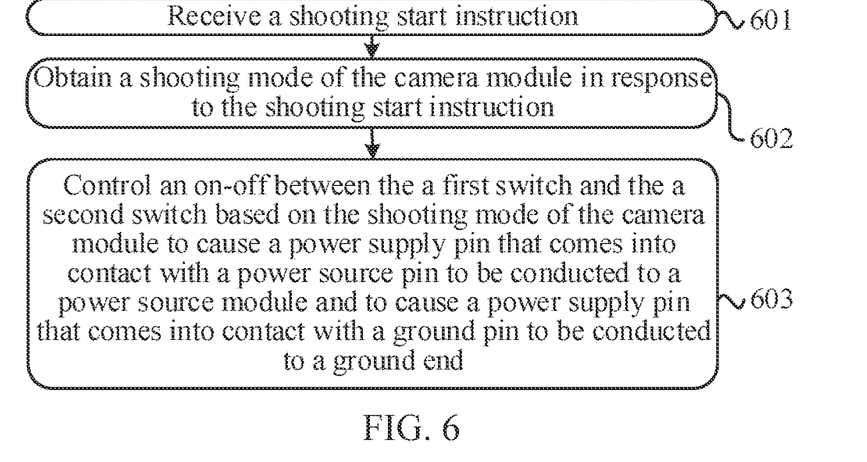
FIG. 6 is a flowchart of a power supply method for a camera module according to an embodiment of this application.

Referring to FIG. 6, a power supply method for a camera module is further provided in this embodiment of this application. The method may be applied to the electronic device described in the foregoing embodiments of this application, and the method may include:

Step 601. Receive a shooting start instruction.

Step 602. Obtain a shooting mode of the camera module in response to the shooting start instruction.

For example, the user can mount the camera module at the preset position of the body, and input a shooting start instruction to the electronic device by clicking on a display screen of the body for displaying an APP icon of a camera application.

Step 603. Control on-off of a first switch and a second switch based on the shooting mode of the camera module to cause a power supply pin contacting with a power source pin to be conducted with a power source module and cause a power supply pin contacting with a ground pin to be conducted with a ground end.

The shooting modes include a front shooting mode and a rear shooting mode, an orientation of a camera of the camera module in the front shooting mode is the same as an orientation of a first surface of the body, an orientation of a camera of the camera module in the rear shooting mode is the same as an orientation of a second surface of the body, and the first surface is arranged opposite to the second surface.

In this embodiment of this application, the power supply circuit as described above is added to the electronic device. Therefore, the on-off of the first switch and the second switch in the power supply circuit can be controlled according to the shooting mode of the camera module, to conduct the power supply pin contacting with the power source pin with the power source module, and conduct the power supply pin contacting with the ground pin with the ground end. As a result, a corresponding power supply loop is formed between the power source module and the camera module, so as to implement normal power supply to the camera module. In addition, the power supply module that is arranged in the body is used to supply power to the camera module. Compared with a manner of arranging a battery in the camera module in the related art, on the one hand, a volume of the camera module can be reduced to ensure the appearance performance of the camera module, and on the other hand, a capacity of the power supply module that is arranged in the body can also be increased as required to extend the operating time of the camera module without changing the volume of the camera module. As a result, the appearance performance and operating time of the compatible camera module can be achieved.

In an embodiment of this application, in a case that the camera module in the rear shooting mode is mounted at the preset position of the body, the power source pin is in contact with the first power supply pin, and the ground pin is in contact with the second power supply pin; and the power source pin is in contact with the second power supply pin, and the ground pin is in contact with the first power supply pin in a case that the camera module in the front shooting mode is mounted on the body.

Correspondingly, the step 603 may include: controlling the first switch to conduct the first power supply pin with the power source module, and controlling the second switch to conduct the second power supply pin with the ground end in a case that the shooting mode of the camera module is the rear shooting mode; and controlling the first switch to conduct the first power supply pin with the ground end and controlling the second switch to conduct the second power supply pin with the power source module in a case that the shooting mode of the camera module is the front shooting mode.

It can be understood that the on-off of the first switch and the second switch is controlled based on the shooting mode of the camera module to ensure normal power supply to the camera module 30 in different shooting modes, so that the electronic device with the detachable camera module can implement functions of different shooting modes, and a control logic is simple.

Further, in another embodiment of this application, the circuit further includes a third switch and a detection pin that is arranged on the body, where the detection pin is in contact with the ground pin in a case that the camera module in the rear shooting mode is mounted at the preset position of the body; and a first end of the third switch is connected to a detection port of the processor, a second end is connected to the detection pin, and a control end is connected to a control port of the processor.

Correspondingly, the step 602 may include: controlling the third switch to conduct the detection port with the detection pin, controlling the second switch to conduct the second power supply pin with the ground end, reading a signal state of the detection port, and detecting the shooting mode of the camera module based on the signal state of the detection port.

It can be understood that automatic detection of the shooting mode of the camera module can be implemented by controlling the on-off of the third switch. In addition, the detection of the shooting mode of the camera module is only based on a signal state of a detection port, a determining logic is simple, and a physical connection signal can be reduced.

Figure 7:
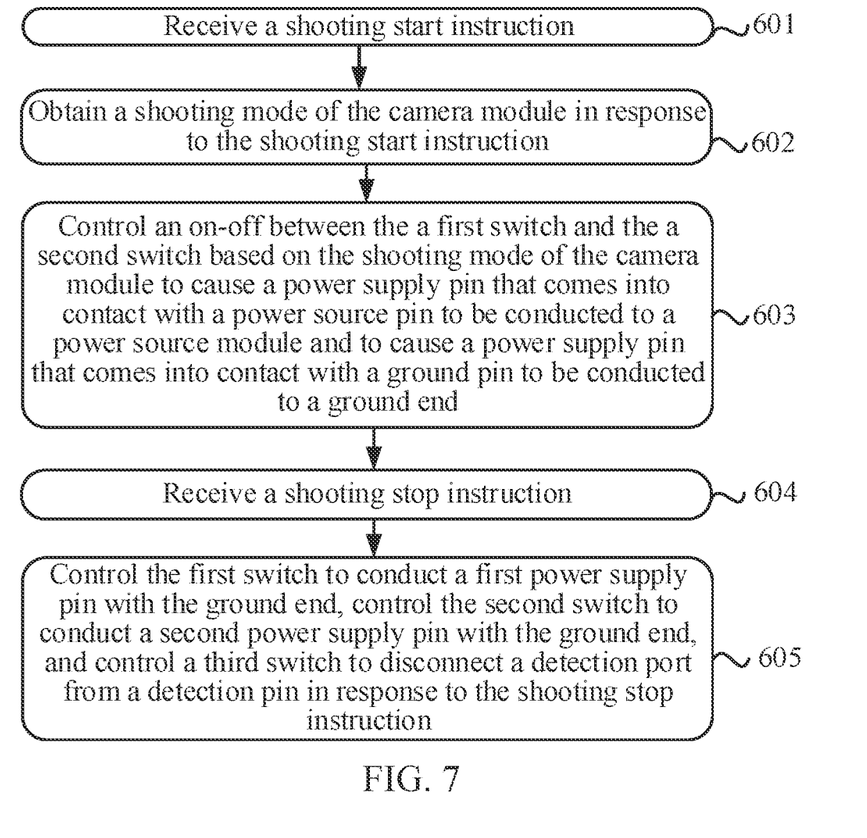
FIG. 7 is another flowchart of a power supply method for a camera module according to an embodiment of this application.

Further, in another embodiment of this application, as shown in FIG. 7, the power supply method described in this embodiment of this application may further include:

Step 604. Receive a shooting stop instruction.

Step 605. Control the first switch to conduct the first power supply pin with the ground end, control the second switch to conduct the second power supply pin with the ground end, and control the third switch to disconnect the detection port from the detection pin in response to the shooting stop instruction.

For example, the user can input the shooting stop instruction to the electronic device by pulling out the camera module from the body, or can input the shooting stop instruction to the electronic device by clicking on a stop button on a display screen of the body. This is not limited in this embodiment of this application.

It can be understood that in a case that the shooting stop instruction is received, the on-off from the first switch to the third switch is controlled to cause both the first power supply pin and the second power supply pin to be connected to the ground and disconnect the detection pin from the detection port, so that the processor in the body can be prevented from being damaged by an external electrical stress.

It should be noted that, for the method embodiment, because the method embodiment is basically similar to the power supply circuit of the camera module described in the foregoing embodiments, and therefore is briefly described herein. For related parts, reference may be made to partial descriptions in the foregoing embodiments.

It should be further noted that the terms "include", "comprise", or any variants thereof are intended to cover a non-exclusive inclusion. Therefore, a process, method, article, or device that includes a series of elements not only includes such elements, but also includes other elements not specified expressly, or may include inherent elements of the process, method, article, or device. Unless otherwise specified, an element limited by "include a/an . . . " does not exclude other same elements existing in the process, the method, the article, or the device that includes the element.

A person skilled in the art should understand that the embodiments of this application may be provided as a method, a system, or a computer program product. Therefore, this application may take the form of hardware-only embodiments, software-only embodiments, or embodiments with a combination of software and hardware. In addition, this application may use a form of a computer program product that is implemented on one or more computer-usable storage media (including but not limited to a disk memory, a CD-ROM, an optical memory, and the like) that include computer-usable program code.

The foregoing descriptions are merely embodiments of this application and are not intended to limit this application. For a person skilled in the art, various modifications and variations can be made to this application. Any modification, equivalent replacement, or improvement made without departing from the spirit and principle of this application shall fall within the scope of the claims of this application.

What is claimed is:

1. A power supply circuit, comprising:
a first power supply pin and a second power supply pin, wherein the first power supply pin and the second power supply pin are separately arranged on a body of an electronic device;
a power source pin and a ground pin, wherein the power source pin and the ground pin are separately arranged on a camera module set, and in a case that the camera module set is mounted at a preset position of the body, the power source pin is in contact with one of the first power supply pin and the second power supply pin and the ground pin is in contact with the other of the first power supply pin and the second power supply pin;
a first switch, wherein a first end of the first switch is connected to the first power supply pin, a second end of the first switch is connected to a power source module set, a third end of the first switch is connected to a ground end, and the first switch is configured to control on and off between the first power supply pin and the power source module set, and control on and off between the first power supply pin and the ground end;
a second switch, wherein a first end of the second switch is connected to the second power supply pin, a second end of the second switch is connected to the power source module set, a third end of the second switch is connected to the ground end, and the second switch is configured to control on and off between the second power supply pin and the power source module set, and control on and off between the second power supply pin and the ground end; and
a processor, wherein the processor is separately connected to the first switch and the second switch, and the processor is configured to control on and off of the first switch and the second switch.

2. The power supply circuit according to claim 1, wherein the processor obtains a shooting mode of the camera module set, and controls the on and off of the first switch and the second switch based on the shooting mode, to cause the power supply pin contacting with the power source pin to be conducted with the power source module set and cause the power supply pin contacting with the ground pin to be conducted with the ground end; and
the shooting mode comprises a front shooting mode and a rear shooting mode, an orientation of a camera of the camera module set in the front shooting mode is the same as an orientation of a first surface of the body, an orientation of a camera of the camera module set in the rear shooting mode is the same as an orientation of a second surface of the body, and the first surface is arranged opposite to the second surface.

3. The power supply circuit according to claim 2, wherein in a case that the camera module set in the rear shooting mode is mounted at the preset position of the body, the power source pin is in contact with the first power supply pin, and the ground pin is in contact with the second power supply pin; and in a case that the camera module set in the front shooting mode is mounted at the preset position of the body, the power source pin is in contact with the second power supply pin, and the ground pin is in contact with the first power supply pin; and
the processor is configured to:
control the first switch to conduct the first power supply pin with the power source module set and control the second switch to conduct the second power supply pin with the ground end in a case that the shooting mode of the camera module set is the rear shooting mode; and
control the first switch to conduct the first power supply pin with the ground end and control the second switch to conduct the second power supply pin with the power source module set in a case that the shooting mode of the camera module set is the front shooting mode.

4. The power supply circuit according to claim 3, wherein the power supply circuit further comprises:
a detection pin, arranged on the body, and the detection pin is in contact with the ground pin in a case that the camera module set in the rear shooting mode is mounted at the preset position of the body; and
a third switch, wherein a first end of the third switch is connected to a detection port of the processor, a second end of the third switch is connected to the detection pin, a control end of the third switch is connected to a control port of the processor, and the third switch is configured to control on and off between the detection port and the detection pin; and
the processor is further configured to, in a case that the electronic device receives a shooting start instruction, control the third switch to conduct the detection port with the detection pin, control the second switch to conduct the second power supply pin with the ground end, and detect the shooting mode of the camera module set based on a signal state of the detection port.

5. The power supply circuit according to claim 4, wherein there are two ground pins, and in a case that the camera module set in the rear shooting mode is mounted at the preset position of the body, one of the ground pins is in contact with the detection pin and the other of the ground pins is in contact with the second power supply pin.

6. The power supply circuit according to claim 4, wherein the detection pin is close to the second power supply pin and is located on a same straight line as the second power supply pin; and
there is one ground pin, and a width of the ground pin is greater than a width of the power source pin, so that the detection pin is in contact with the ground pin in a case that the camera module set in the rear shooting mode is mounted at the preset position of the body.

7. The power supply circuit according to claim 6, wherein the width of the ground pin is twice the width of the power source pin.

8. The power supply circuit according to claim 4, wherein the processor is further configured to:
in a case that the electronic device receives a shooting stop instruction, control the first switch to conduct the first power supply pin with the ground end;
control the second switch to conduct the second power supply pin with the ground end; and
control the third switch to disconnect the detection port from the detection pin.

9. The power supply circuit according to claim 1, wherein the power source pin and the ground pin are located on the same straight line, and the power source pin and the ground pin are symmetrically arranged relative to a center line of the camera module set.

10. An electronic device, comprising:
a body, wherein a power source module set is arranged in the body;
a camera module set detachably connected to the body; and
a power supply circuit, wherein the power supply circuit comprises:
a first power supply pin and a second power supply pin, wherein the first power supply pin and the second power supply pin are separately arranged on a body of an electronic device;
a power source pin and a ground pin, wherein the power source pin and the ground pin are separately arranged on the camera module set, and in a case that the camera module set is mounted at a preset position of the body, the power source pin is in contact with one of the first power supply pin and the second power supply pin and the ground pin is in contact with the other of the first power supply pin and the second power supply pin;
a first switch, wherein a first end of the first switch is connected to the first power supply pin, a second end of the first switch is connected to the power source, a third end of the first switch is connected to a ground end, and the first switch is configured to control on and off between the first power supply pin and the power source, and control on and off between the first power supply pin and the ground end;
a second switch, wherein a first end of the second switch is connected to the second power supply pin, a second end of the second switch is connected to the power source, a third end of the second switch is connected to the ground end, and the second switch is configured to control on and off between the second power supply pin and the power source, and control on and off between the second power supply pin and the ground end; and
a processor, wherein the processor is separately connected to the first switch and the second switch, and the processor is configured to control on and off of the first switch and the second switch.

11. The electronic device according to claim 10, wherein the processor, the first switch, and the second switch are all arranged in the body.

12. The electronic device according to claim 10, wherein the power source module set comprises a rechargeable battery, and the rechargeable battery is separately connected to the second end of the first switch and the second end of the second switch.

13. The electronic device according to claim 12, wherein the power source module set further comprises a power management unit, and the rechargeable battery is separately connected to the second end of the first switch and the second end of the second switch through the power management unit.

14. A power supply method, performed by an electronic device, wherein the method comprises:
receiving a shooting start instruction;
obtaining a shooting mode of a camera module set in response to the shooting start instruction; and
controlling on and off of a first switch and a second switch based on the shooting mode, to cause a power supply pin contacting with a power source pin to be conducted with a power source module set and cause the power supply pin contacting with a ground pin to be conducted with a ground end,
wherein the shooting mode includes a front shooting mode and a rear shooting mode, an orientation of a camera lens of the camera module set in the front shooting mode is the same as an orientation of a first surface of a body of the electronic device, an orientation of the camera lens of the camera module set in the rear shooting mode is the same as an orientation of a second surface of the body, and the first surface is arranged opposite to the second surface.

15. The method according to claim 14, wherein in a case that the camera module set in the rear shooting mode is mounted at a preset position of the body, the power source pin is in contact with a first power supply pin, and the ground pin is in contact with a second power supply pin; and in a case that the camera module set in the front shooting mode is mounted at the preset position of the body, the power source pin is in contact with the second power supply pin, and the ground pin is in contact with the first power supply pin; and the controlling on and off of the first switch and the second switch based on the shooting mode comprises:

controlling the first switch to conduct the first power supply pin with the power source module set and controlling the second switch to conduct the second power supply pin with the ground end in a case that the shooting mode of the camera module set is the rear shooting mode; and controlling the first switch to conduct the first power supply pin with the ground end and controlling the second switch to conduct the second power supply pin with the power source module set in a case that the shooting mode of the camera module set is the front shooting mode.

16. The method according to claim 15, wherein a power supply circuit of the electronic device further comprises a third switch and a detection pin that is arranged on the body, wherein the detection pin is in contact with the ground pin in a case that the camera module set in the rear shooting mode is mounted at the preset position of the body; a first end of the third switch is connected to a detection port of the processor, a second end is connected to the detection pin, and a control end is connected to a control port of the processor; and the obtaining a shooting mode of the camera module set comprises:

controlling the third switch to conduct the detection port with the detection pin;

controlling the second switch to conduct the second power supply pin with the ground end;

reading a signal state of the detection port; and detecting the shooting mode of the camera module set based on the signal state of the detection port.

17. The method according to claim 16, wherein the method further comprises:

receiving a shooting stop instruction; and controlling the first switch to conduct the first power supply pin with the ground end, controlling the second switch to conduct the second power supply pin with the ground end, and controlling the third switch to disconnect the detection port from the detection pin in response to the shooting stop instruction.

* * * * *